(12) United States Patent
Da Silveira et al.

(10) Patent No.: US 8,298,360 B2
(45) Date of Patent: Oct. 30, 2012

(54) PROCESS FOR OBTAINING PIPES AND JOINTS FROM A POLYMER COMPOSITE

(75) Inventors: Gabriel Antonio Da Silveira, Joinville (BR); Claudio Jose Melatto, Joinville (BR)

(73) Assignee: Interfibra Industrial S/A, Joinville (BR)

( * ) Notice: Subject to any disclaimer, the term of this patent is extended or adjusted under 35 U.S.C. 154(b) by 371 days.

(21) Appl. No.: 12/541,629

(22) Filed: Aug. 14, 2009

(65) Prior Publication Data

US 2010/0038019 A1  Feb. 18, 2010

(30) Foreign Application Priority Data

Aug. 15, 2008 (BR) .................................. PI0802773

(51) Int. Cl.
*B65H 81/00* (2006.01)
(52) U.S. Cl. ......... 156/173; 156/166; 156/169; 156/172
(58) Field of Classification Search .................. 156/166, 156/169, 172, 173
See application file for complete search history.

(56) References Cited

U.S. PATENT DOCUMENTS

| 5,213,379 | A | * | 5/1993 | Taniguchi et al. | ............ 285/390 |
| 5,811,497 | A | * | 9/1998 | Hayase et al. | ................ 525/523 |
| 6,737,134 | B2 | * | 5/2004 | Friedrich et al. | ............. 428/36.3 |

* cited by examiner

*Primary Examiner* — Khanh P Nguyen
*Assistant Examiner* — Carson Gross
(74) *Attorney, Agent, or Firm* — Muncy, Geissler, Olds & Lowe, PLLC

(57) ABSTRACT

A process for obtaining pipes and connections from a polymeric composite is provided. An internal pipe is formed using a fiberglass and epoxy resin matrix. Made in a mold by filament winding a roving wire, the internal pipe is impregnated with epoxy resin and catalyzed with a heat curing agent. The pipe extremities are formed through a mold using a composite of epoxy resin and carbon fiber base. The external face of the internal layer is sanded. A second layer is formed by filament winding a roving wire, impregnated with polyester resin with an added silica base, and catalyzed with cold-cured cobalt and polyester. Charge is added to the silica base. The polyester resin is deposited in an intercalated manner between the layers of winding filament. A third layer of polyurethane is deposited over the second layer and cold cured.

6 Claims, 4 Drawing Sheets

PROCESS FOR OBTAINING PIPES AND JOINTS FROM A POLYMER COMPOSITE

BACKGROUND OF THE INVENTION

1. Field of the Invention

The present invention is a PROCESS FOR OBTAINING PIPES AND CONNECTIONS FROM A POLYMERIC COMPOSITE, which was developed with the purpose of providing non-metallic pipes and connections made of a polymeric composite material, for application in surge flow lines of oil wells, injection of fresh water, injection of salt water, injection of produced water and injection of CO2 in the oil production fields, whose structural characteristics provide support against mechanic impacts and wheel loads, provide protection against elements of the environment, allow a maximum fluid temperature of 95° C., allow an operative pressure of from 500 to 3000 PSI, protect against electrochemical corrosion and abrasive wear provoked by silica in a suspension produced by the fluid (water, oil and gas) arising from the oil well. This technologic innovation replaces the metallic surge flow lines of wells that are currently made of material API 5L GR B.

2. Discussion of the Related Art

For the production of crude oil (oil, gas and water), oil companies currently use aerial surge flow lines of steel API 5L GR B having a diameter of 3 inches, that permit a maximum pressure of 1000 psi and a maximum operation temperature of 65° C. These lines are widely used, and installed in thousands of kilometers. These production installations are subject to atmospheric corrosion and electrochemical corrosion in accordance with the environment and fluids produced in the oil wells. Many of these wells are considered critical due to the fluid produced that provokes high premature wear and internal corrosion in the metallic surge flow lines. Some of these lines, depending on the composition of the fluid produced, start leaking after less than one year of operation due to internal corrosion.

The pipes used in the surge flow lines, especially ones made of steel, are subject to deterioration, both by mechanical action (wear) and by chemical or electrochemical action (corrosion), or by the joint action of both.

With regard to internal corrosion, the oxygen present in the water vapor contained in the atmospheric air is one of the main factors responsible for oxidation and it is universally present, including on the inside of the pipe. Therefore, it promotes oxidation mainly in the form of pits (cavities having an angular shaped bottom and a depth greater than its diameter) that decrease the life span of the pipe. This type of corrosion is responsible for approximately 20% of the total corrosion that occurs in the pipe.

The internal corrosion of the metals near the coast is a process that occurs due to the presence of salts dissolved in the water droplets, which forms an electrolyte solution. With the increase of electric charge flow (ions) in the solution, there is a potentiation of the corrosion process due to the oxidizing power of the oxygen in the atmospheric air. In the case of pipes, the external corrosion is presented uniformly, being the main manner of loss of mass of the pipe (around 80%), because it is presented in the whole exterior surface. A uniform loss of thickness of the exposed layer occurs.

Due to the problems caused by metal pipes, pipes, pipes formed of fiberglass with epoxy resin have been used with success in highly aggressive environments, where steel and its alloys last for only weeks or months. The exceptional resistance to corrosion of the composite of these materials, even when in contact with alkaline, acid, and solvent environments have been affirmed and well documented for decades. The extremely high chemical resistance of the pipes allows their application in most cases in which the conventional materials are destroyed by corrosion. They do not require cathodic protection due to their very low electric conductivity.

The composite constructed with fiberglass with epoxy resin offers lightness, good mechanical properties and exceptional chemical inertia in a broad range of aggressive environments.

However, pipes made from fiberglass may only be used underground, thus, ditches having an average depth of 60 cm and width of 40 cm should be provided, observing that the ditches should not have hard rocks and particles therein, as these hard rocks and particles may come into contact with the pipes and damage them. It is therefore necessary for the ditches to have a layer of sand in the bottom, where the pipes are deposited and the pipes then covered with another layer of sand. Only then may the material removed from the ditch be placed (backfill).

When it becomes necessary for an aerial stretch to cross-streams or other obstacles, the pipes are jacketed. This is both for the protection of the fiber pipe against solar beams and for protection against vandalism. This jacketing is later painted and has indicative inscriptions regarding the material being transported, the pressure, etc. The jacketing covers the whole aerial part and penetrates at least 50 cm into the ground. To avoid contact with the jacketing, the pipes are protected through rubber strips.

Despite its good applicability in relation to corrosion, those pipes have a low resistance to impact, and they may only be used underground in deep ditches in order to avoid such impact by wheels. This contributes to an increase of the project's cost.

For its low resistance to
impact, the fiberglass pipes are not used in surge flow lines, thus obliging the oil companies to use metal pipes, which require constant maintenance and stoppage of lines causing financial losses.

SUMMARY OF THE INVENTION

The technological advances in the composite area, applied to the oil industry, are increasingly intense. As a response to this scenario, it is an aim of the present invention to solve the technical problems of metallic material, due to its structural limitations. This invention provides a PROCESS FOR OBTAINING PIPES AND CONNECTIONS FROM A POLYMERIC COMPOSITE comprising an internal tube (1) with a thickness of 3.0 to 8.0 mm, made of fiberglass and epoxy resin matrix to resist corrosion caused by abrasion of the fluid produced and the abrasiveness of the solids suspended therein. The pipe of the present application is made in a polished metallic mold, in a filament winding process with a roving wire, having a winding angle from 52° to 55°, being impregnated with epoxy resin, and being catalyzed with a heat curing agent with an aromatic base, anhydride and aliphatic amine, to provide protection against chemical attacks and temperature. The extremities of the internal pipe are made from a mold with a molded screw threads and a composite with an epoxy resin and carbon fiber base. The external face (2) of the internal layer (1) undergoes a sanding process using a water sandpaper which decreases brightness increases the adherence thereof for accommodation of a second layer (3). This second layer (3) is formed by filament winding with a roving wire having a winding angle between 80° and 85°, has a thickness of 5.0 mm to 8.0 mm, is impregnated with polyester resin with an added silica charge having a particle size of 40/60 μm, and catalyzed with cold-cured cobalt and polyester. The polyester resin is deposited in the form of outpouring by gravity, interspersed between the layers of winding filament This increases structural integrity of the product by mechanical resistance, particularly with regard to impact and wheel loads. A third layer (4) of polyurethane is deposited over the second layer (3), this third layer (4) having thickness of 1.0 to 4.0 mm, then cold cured, whose function is to supply the pipe with mechanical structure, additionally increasing its resistance to impact and weather.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE PREFERRED EMBODIMENTS

Figure 1:
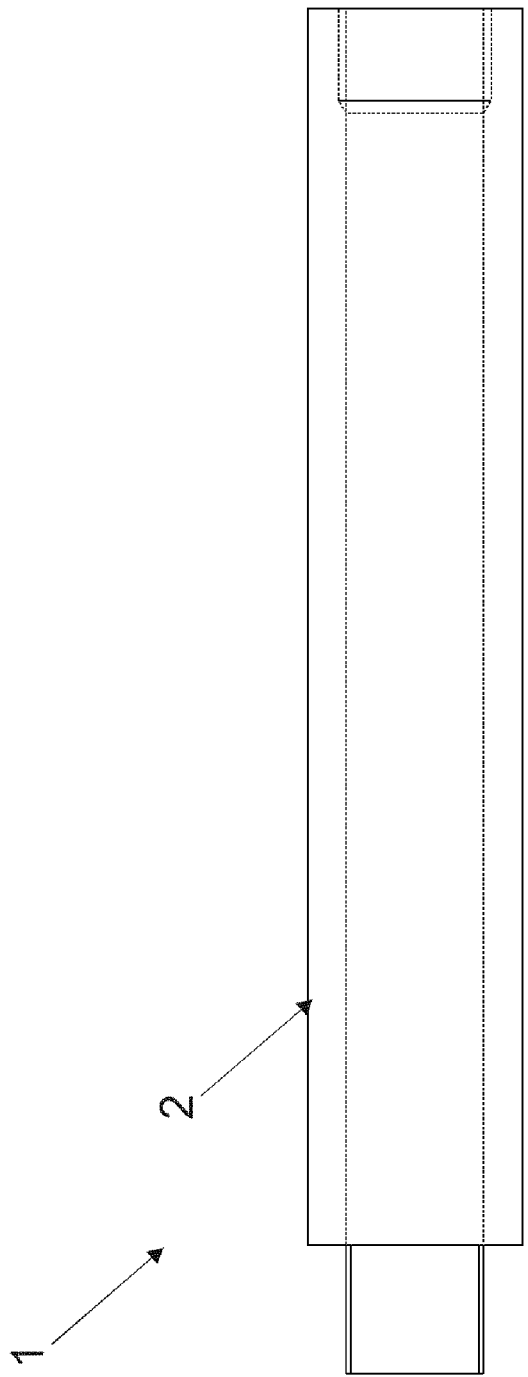
FIG. 1 shows a lateral view of the pipe with a first layer (2).
Figure 2:
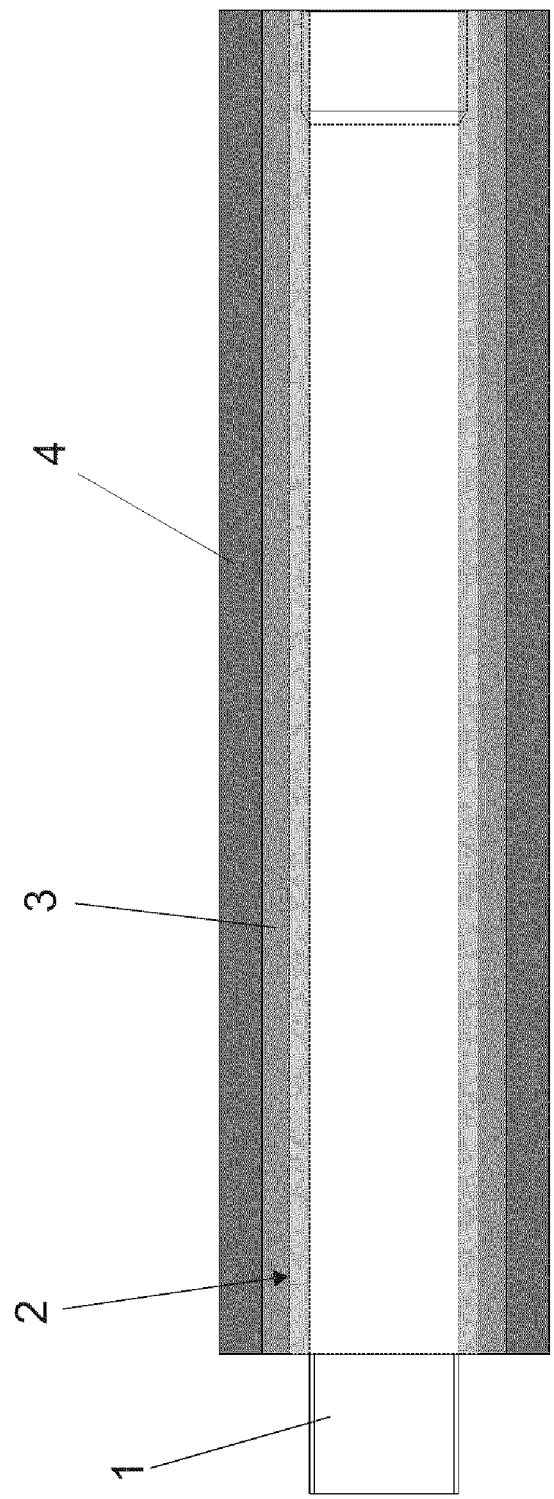
FIG. 2 shows a lateral view of the pipe with a first, second and third layers (2,3,4).
Figure 3:
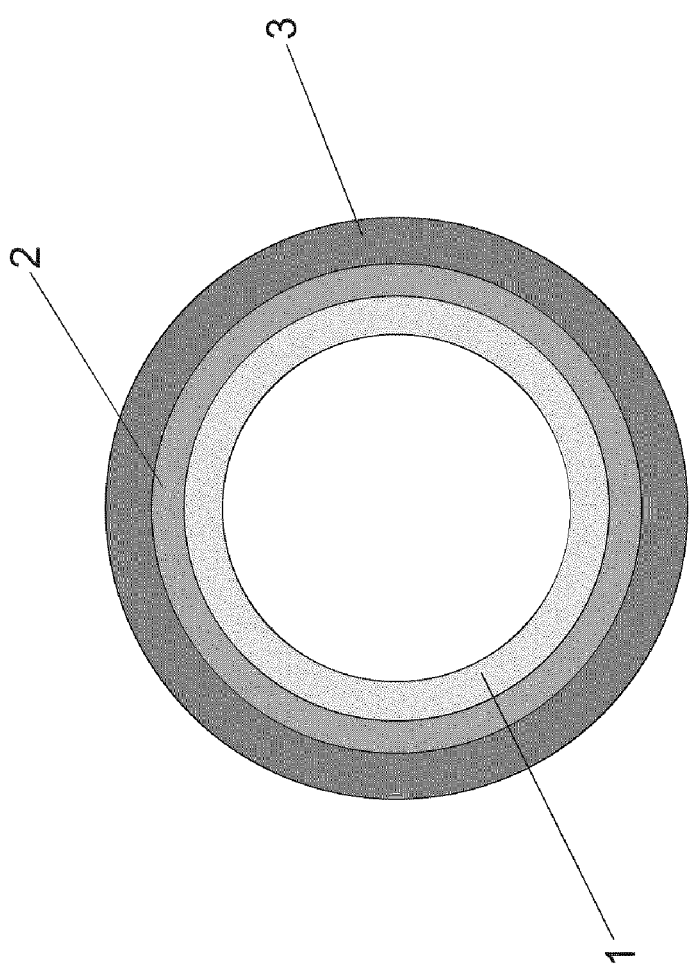
FIG. 3 shows a longitudinal section of the pipe having three (3) layers.
Figure 4:
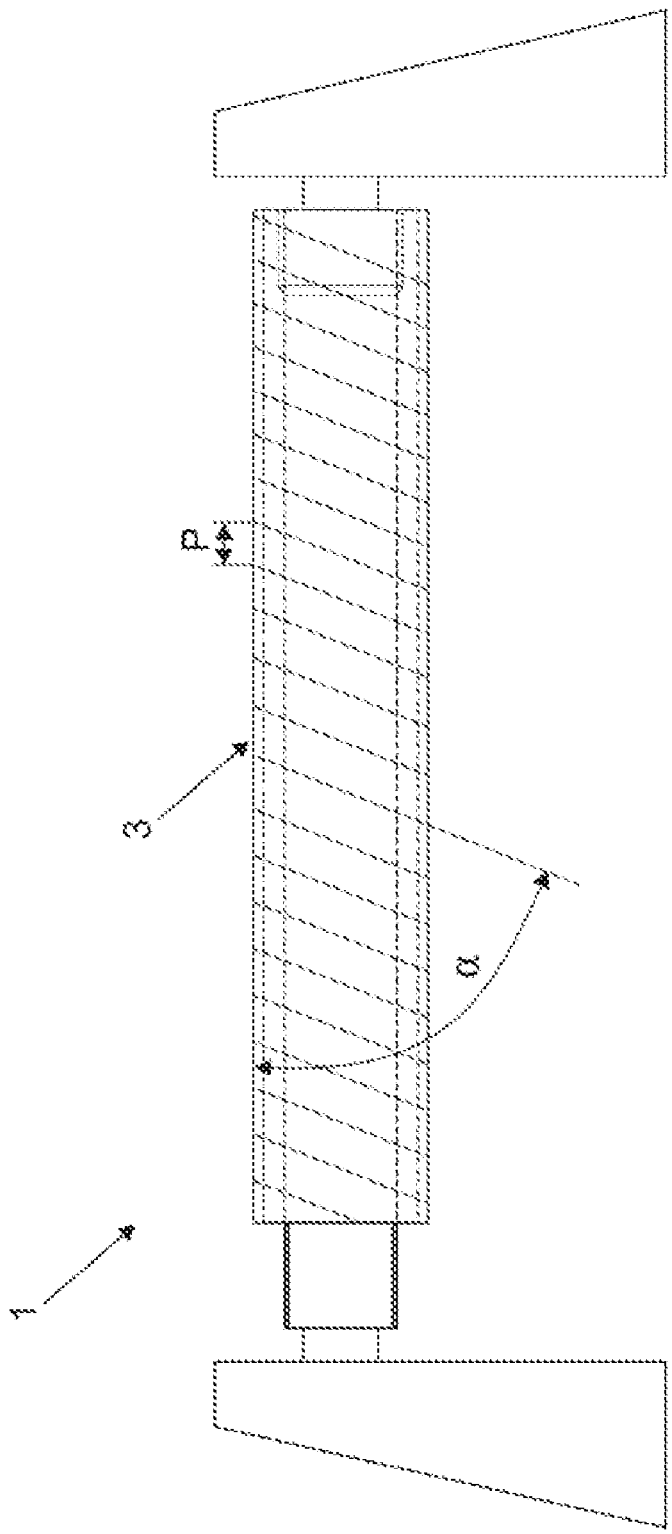
FIG. 4 shows a cross-sectional view of the pipe having three (3) layers.

Based on the foregoing description it is notable that the PROCESS FOR OBTAINING PIPES AND CONNECTIONS FROM A POLYMERIC COMPOSITE of the present invention brings enormous advantages, because it is a pipe in polymeric composite for application in surge flow lines of oil wells, injection of fresh water, injection of salt water, and injection of CO2 in the field of oil production, which provides satisfactory resistance to mechanical impact, wheel loads, corrosion, and weather, and withstanding a maximum temperature of 95° C. and a pressure of 500 to 3000 PSI.

The process claimed herein presents a pipe that has a high internal resistance to corrosion provoked by the soil (clay with a predominance of silica) and by the fluids produced (water, oil and gas), in addition to a high resistance to abrasion provoked by solid particles (silica originating from the well) suspended in such fluid. The process claimed herein also presents a pipe which has a high external mechanical resistance to impact and wheel loads, in addition to presenting resistance to the weather.

The pipe of the present invention made with three (3) layers also has the following advantages:

Greater ease in assembly. It does not require welds and sophisticated qualification of manpower;

Free movement of personnel and equipment in the regions installed when buried;

The line when buried exempts anchoring;

Waives mechanical equipment for handling and installation, due to lightweight pipes;

Greater quantity of pipes may be installed per man hour;

Reduces the environmental impact visually.

Lower cost in relation to the Steel Surge Flow Line with aerial installation;

Greater life span of the line;

High resistance to weather, including ultraviolet rays;

Waives external painting;

Very high resistance to internal and external corrosion of the following fluids:

Internal

Oil

Fresh Water

Produced Water

Salt Water $CO_2$ $H_2S$

External:

Oil

Fresh Water

Produced Water

Salt Water $CO_2$ $H_2S$

Acetone

Methyl ethyl ketone

This technological innovation is a technical proposal to replace the surge flow lines of the wells that are currently in material API 5L GR B, therefore, for being innovative and so far not being in the status of technique it fits perfectly in the criteria that define the patent of invention. Its claims are the following.

The invention claimed is:

1. A process for obtaining pipes and connections from a polymeric composite, comprising:

forming one internal pipe with a thickness from 3.0 to 8.0 mm using a fiberglass and epoxy resin matrix;

molding the internal pipe in a polished metallic mold by filament winding a first layer of roving wire at a winding angle of 52° to 55°, impregnating the first layer with epoxy resin, and catalyzing with a heat curing agent having an aromatic amine base, anhydride, and aliphatic amine;

forming the extremities of the internal pipe with a mold having molded screw threads, using a composite with an epoxy resin and carbon fiber base;

fixing the extremities of the internal pipe in an equipment which provides traction and prevents buckling;

rotating the internal pipe to a speed of 35 rpm;

applying a water sandpaper to the entire external surface of the internal pipe in order to decrease brightness and increase adherence thereto;

cleaning the internal pipe after sanding; and washing the internal pipe with an acetone-based degreasing composition.

2. The process for obtaining pipes and connections from a polymeric composite of claim 1, further comprising:

filament winding a second layer of roving wire on the external surface of the washed internal pipe at a winding angle (α) of 80° to 85° that defines the pitch (P), the second layer having a thickness of 5.0 mm to 8.0 mm;

impregnating the second layer with polyester resin with an added silica base, and catalyzing with cold-cured cobalt and polyester;

adding charge to the silica base; and cold curing the second layer.

3. The process for obtaining pipes and connections from a polymeric composite of claim 2, further comprising:

depositing the polyester resin with an added silica base in an intercalated manner between the first and second layers.

4. The process for obtaining pipes and connection from a polymeric composite of claim 2, further comprising:

after the second layer is added, fixing the pipe in the traction equipment and rotating the same;

depositing a third layer over the second layer through outpouring by gravity, the third layer comprising polyurethane and having a thickness of 1.0 to 4.0 mm;

cold curing the third layer.

5. The process for obtaining pipes and connections from a polymeric composite of claim 4, wherein the pipe's resistance to impact is determined by the thickness of the second and third layers.

6. The process for obtaining pipes and connections from a polymeric composite of claim 4, wherein the composition of the pipe allows its use in aerial surge flow lines.

* * * * *